US012771632B2

(12) United States Patent
Agarwal et al.

(10) Patent No.: US 12,771,632 B2
(45) Date of Patent: Oct. 20, 2026

(54) CONTROLLING FLOW PROCESSING BY AN EDGE CLUSTER SPANNING MULTIPLE DATACENTER LOCATIONS OF A PUBLIC CLOUD

(71) Applicant: VMware LLC, Palo Alto, CA (US)

(72) Inventors: Minjal Agarwal, Santa Clara, CA (US); Yong Wang, San Jose, CA (US); Abhishek Goliya, Pune (IN); Kai-Wei Fan, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 196 days.

(21) Appl. No.: 18/648,171

(22) Filed: Apr. 26, 2024

(65) Prior Publication Data

US 2025/0106141 A1 Mar. 27, 2025

(30) Foreign Application Priority Data

Sep. 21, 2023 (IN) ............................ 202341063420

(51) Int. Cl.
*H04L 45/12* (2022.01)
*H04L 43/10* (2022.01)
*H04L 45/24* (2022.01)

(52) U.S. Cl.
CPC ............ *H04L 45/123* (2013.01); *H04L 43/10* (2013.01); *H04L 45/24* (2013.01)

(58) Field of Classification Search
CPC ........ H04L 45/123; H04L 43/10; H04L 45/24
See application file for complete search history.

(56) References Cited

U.S. PATENT DOCUMENTS 10,193,749 B2 * 1/2019 Hira .................... H04L 41/0895
10,747,630 B2 * 8/2020 Sanakkayala ......... G06F 11/301
12,483,495 B1 * 11/2025 Henkel .................. H04L 45/04
2015/0244617 A1 * 8/2015 Nakil ...................... G06F 11/07 709/224
2017/0223117 A1 * 8/2017 Messerli ............... H04L 47/783
2018/0062917 A1 * 3/2018 Chandrashekhar .......................... G06F 11/2035
2018/0063086 A1 * 3/2018 Hira ...................... H04L 41/044
2019/0281014 A1 * 9/2019 Lin ..................... G06F 11/2023
2020/0220802 A1 * 7/2020 Goliya ................ H04L 41/0894
2020/0334113 A1 * 10/2020 Sanakkayala ......... G06F 11/301
2021/0067468 A1 * 3/2021 Cidon ..................... H04L 45/42
2021/0314291 A1 * 10/2021 Chandrashekhar ..... H04L 45/44
2022/0329461 A1 * 10/2022 Hira ........................ H04L 45/72
(Continued)

*Primary Examiner* — Jimmy H Tran
(74) *Attorney, Agent, or Firm* — Quarles & Brady LLP

(57) ABSTRACT

Some embodiments provide a method for controlling flow processing by an edge cluster including a first edge machine set operating in a first location set of a public cloud and a second edge machine set operating in a second location set of the public cloud. A controller set configures first and second managed forwarding element (MFE) sets operating in the first and second location sets respectively, with first and second forwarding rule sets to respectively forward first and second flows sets to the first and second edge machine sets for performing services. The first forwarding rule set specifies a first network address set for the first edge machine set, and the second forwarding rule set specifies a second network address set for the second edge machine set. The controller set monitors each edge machine to determine whether it is available to perform the services.

19 Claims, 7 Drawing Sheets

(56) References Cited

U.S. PATENT DOCUMENTS

| | | | | |
|---|---|---|---|---|
| 2022/0353175 | A1* | 11/2022 | Ramaswamy | H04L 45/04 |
| 2023/0029079 | A1* | 1/2023 | Vemulpali | H04L 9/3226 |
| 2023/0224240 | A1 | 7/2023 | Wang et al. | |
| 2023/0254183 | A1* | 8/2023 | Sridhar | H04L 49/25 370/389 |
| 2023/0262022 | A1* | 8/2023 | Wang | G06F 9/45558 709/245 |
| 2023/0328590 | A1* | 10/2023 | Trujillo | H04W 28/0226 370/329 |
| 2023/0344777 | A1* | 10/2023 | Brar | H04L 47/2433 |
| 2024/0031296 | A1* | 1/2024 | Ramaswamy | H04L 67/10 |
| 2024/0054004 | A1* | 2/2024 | Brar | H04L 49/70 |
| 2024/0106760 | A1* | 3/2024 | Brar | H04L 47/26 |
| 2024/0152374 | A1* | 5/2024 | Makhijani | G06F 9/45558 |
| 2025/0071019 | A1* | 2/2025 | Agarwal | H04L 41/0816 |
| 2025/0199843 | A1* | 6/2025 | Kavathia | H04L 41/40 |
| 2026/0149667 | A1* | 5/2026 | Lenglet | H04L 47/2441 |

* cited by examiner

CONTROLLING FLOW PROCESSING BY AN EDGE CLUSTER SPANNING MULTIPLE DATACENTER LOCATIONS OF A PUBLIC CLOUD

CROSS-REFERENCE TO RELATED APPLICATIONS

This application is a non-provisional application claiming priority to Indian patent application Ser. No. 20/234,1063420, filed Sep. 21, 2023, by VMware LLC and titled, "CONTROLLING FLOW PROCESSING BY AN EDGE CLUSTER SPANNING MULTIPLE DATACENTER LOCATIONS OF A PUBLIC CLOUD", which is incorporated herein by reference in its entirety for all purposes.

BACKGROUND

Edge devices implemented as edge cluster of multiple edge machines can be deployed in multiple locations (e.g., multiple availability zones) of a single public cloud. However, the public cloud provider of the public cloud in some embodiments charges the network administrator each time a data message is exchanged across locations. Hence, methods and systems are needed to avoid charges incurred to a network administrator that deploys an edge cluster as edge machines in multiple locations.

BRIEF SUMMARY

Some embodiments provide a novel method for controlling data message flow processing by an edge cluster that includes (1) a first set of edge machines operating in a first set of datacenter locations of a particular public cloud and (2) a second set of edge machines operating in a second set of datacenter locations of the particular public cloud. A set of one or more controllers that controls the edge cluster configures first and second sets of managed forwarding elements (MFEs) operating in the first and second datacenter location sets respectively with first and second sets of forwarding rules to respectively forward first and second sets of data message flows to the first and second sets of edge machines for performing a set of services on the first and second sets of data message flows. The first set of forwarding rules specifies a first set of network addresses associated with the first set of edge machines and the second set of forwarding rules specifies a second set of network addresses associated with the second set of edge machines. The controller set monitors each edge machine in the first and second sets of edge machines to determine whether the edge machine is available to perform the set of services. After determining that each edge machine in the first set of edge machines is not available, the controller set reassigns the first set of network addresses from the first set of edge machines to the second set of edge machines such that the first MFE set forwards the first set of data message flows to the second set of edge machines based on the first set of forwarding rules.

In some embodiments, the edge cluster implements a gateway operating at a boundary between a logical network and an external network to forward data messages exchanged between the logical network and the external network. In such embodiments, the edge machines that implement the edge cluster operate to perform edge services (e.g., forwarding, middlebox services, etc.) on the flows exchanged between the logical and external networks.

The first and second MFE sets are configured in some embodiments with the first and second sets of forwarding rules to minimize forwarding data messages between the first and second datacenter location sets. Because a network administrator of the edge cluster is charged by the public cloud provider of the particular public cloud each time a data message is exchanged across datacenter location sets (e.g., when each datacenter location set is a different availability zone), the controller set minimizes such cross-location set traffic to minimize costs to the network administrator. The controller set in some embodiments allows cross-location set traffic when an entire set of edge machines in a particular datacenter location set fails, as with the first set of edge machines. In order to not drop flows received at the first MFE set, the controller set reassigns the first edge machine sets' network addresses to the second edge machine set, even though this means the flows will traverse multiple datacenter location sets.

The controller set monitors each edge machine in some embodiments by periodically sending heartbeat data messages to the edge machine to determine whether it is available to perform the set of services. If the controller set receives a reply heartbeat data message from the edge machine, the controller set determines that it is available and operational. In some embodiments, the controller set receives, from at least one edge machine in the second edge machine set, one or more reply heartbeat data messages indicating that the at least one edge machine is available to perform the set of services. From these reply heartbeat messages, the controller set determines that the at least one edge machine is available to perform the set of services. To determine that each edge machine in the first edge machine set is not available, the controller set does not receive a reply heartbeat data message from any edge machine in the first edge machine set, indicating that each edge machine in the first set of edge machines is unavailable to perform the set of services.

In some embodiments, one or more edge machines of the edge cluster also perform one or more middlebox service operations on the data messages exchanged between the logical network and the external network in addition to forwarding the data messages. Examples of middlebox services an edge machine performs include firewall services, load balancing services, Network Address Translation (NAT) services, Intrusion Detection System (IDS) services, and Intrusion Prevention System (IPS) services. Any middlebox service can be performed by an edge machine of an edge cluster.

The controller set in some embodiments also configures (1) a first set of Top-of-Rack (ToR) switches operating in the first datacenter location set to forward a third set of data message flows to the first set of edge machines to perform the set of services on the third set data message flows, and (2) a second set of ToR switches operating in the second datacenter location set to forward a fourth set of data message flows to the second set of edge machines to perform the set of services on the fourth set data message flows. In such embodiments, the first and second MFE sets forward the first and second sets of data message flows from the logical network to the external network through the edge cluster, and the first and second sets of ToR switches forward the third and fourth sets of data message flows from the external network to the logical network through the edge cluster. Namely, the logical switches handle egress traffic from the logical network and the ToR switches handle ingress traffic from the external network. The ToR switches are in some embodiments third-party appliances.

In some embodiments, the first and third sets of data message flows are different directions of a first same set of bidirectional flows, and the second and fourth sets of data message flows are different directions of a second same set of bidirectional flows. In such embodiments, because the MFEs and ToR switches respectively handle egress and ingress flows, the MFEs and ToR switches handle different directions of the same flows.

The first and second sets of ToR switches forward the third and fourth data message flows to the first and second sets of edge machines using equal-cost multi-path (ECMP) routing. In such embodiments, different data messages of a same flow may be forwarded to different edge machines in one datacenter location set, depending on which path the ToR switch determines is the best path at that time.

In some embodiments, set of controllers implements a local control plane (LCP) of the logical network. In such embodiments, the controller set is a first controller set, and a second set of one or more controllers implementing a central control plane (CCP) of the logical network directs the LCP to perform its operations. In some of these embodiments, the CCP is managed by a set of one or more management servers implementing a management plane (MP) of the logical network. In such embodiments, the MP interacts with the network administrator (e.g., through a user interface (UI), a graphical user interface (GUI), etc.) and directs the CCP to perform operations based on the MP's interactions with the network administrator.

After a particular period of time, the controller set in some embodiments determines that the first set of edge machines is available to perform the set of services. In such embodiments, the controller set reassigns the first set of network addresses back to the first set of edge machines such that the first MFE set forwards subsequent data messages of the first set of data message flows to the first set of edge machines. As such, the controller set avoids allowing cross-location set traffic, as it is not required anymore to avoid dropping flows sent to the first MFE set.

Examples of datacenter location sets include a set of different buildings in at one location or a set of different datacenters in different regions (e.g., neighborhoods, cities, states, countries, etc.). Conjunctively or alternatively, the first and second datacenter location sets are first and second availability zones of the particular public cloud.

Each edge machine is in some embodiments, one of a virtual machine (VM), a container, or a pod executing on a host computer. In such embodiments, the first set of edge machines executes on a first set of one or more host computers and the second set of edge machines executes on a second set of one or more host computers. In some embodiments, the first and second sets of host computers are mutually exclusive, meaning that no host computer executes both an edge machine in the first edge machine set and an edge machine in the second edge machine set. In other embodiments, at least a first edge machine in the first edge machine set and at least a second edge machine in the second edge machine set execute on a same host computer.

In some embodiments, each edge machine includes a Tier-0 (0) service router (SR) component and a Tier-1 (T1) SR component to implement a service router of the edge machine. In such embodiments, the T0 SR component receives flows from its associated MFE set and the T1 SR component receives flows from its associated set of ToR switches.

Each MFE is in some embodiments one of a managed switch or a managed router. In some of these embodiments, each MFE set implements one or more instances of one distributed logical forwarding element (LFE) that spans the first and second datacenter location sets. In such embodiments, while the instances implement one distributed logical forwarding element, each instance receives different set of forwarding rules relating to edge machines in their respective datacenter location set to avoid cross-location set traffic (i.e., no instance receives forwarding rules specifying edge machines in other datacenter location sets, unless their datacenter location set's edge machines are all unavailable).

When each MFE is a managed router, the first and second sets of forwarding rules are first and second sets of policy-based routing (PBR) rules. In such embodiments, the controller set determines the PBR rules based on one or more policies defined by the network administrator of the edge cluster, and provides the PBR rules to the managed router sets.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
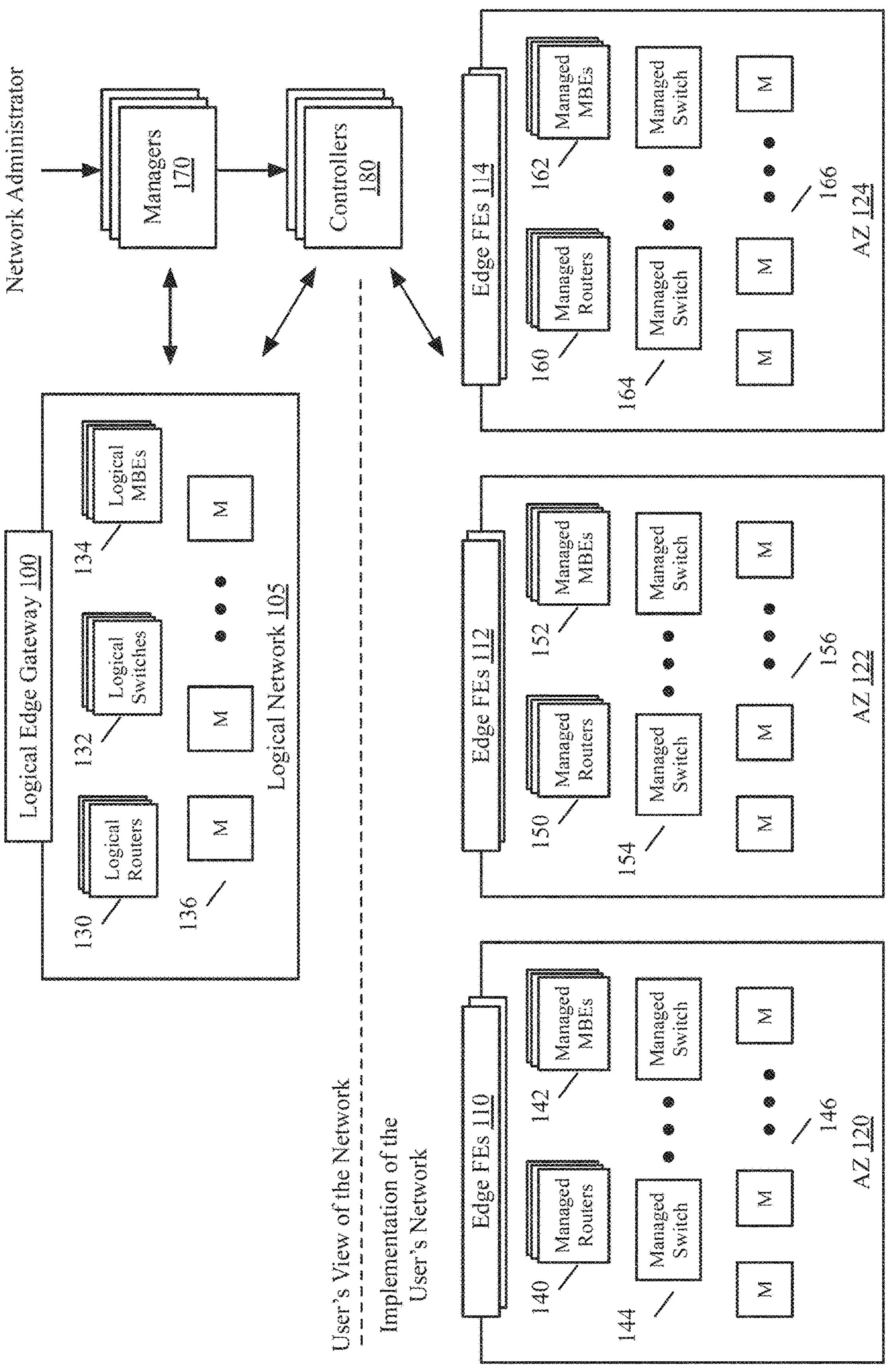
FIG. 1 illustrates an example logical edge gateway of a network administrator's logical network implemented as edge FEs in a set of AZs.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for controlling data message flow processing by an edge cluster that includes (1) a first set of edge machines operating in a first set of datacenter locations of a particular public cloud and (2) a second set of edge machines operating in a second set of datacenter locations of the particular public cloud. A set of one or more controllers that controls the edge cluster configures first and second sets of managed forwarding elements (MFEs) operating in the first and second datacenter location sets respectively with first and second sets of forwarding rules to respectively forward first and second sets of data message flows to the first and second sets of edge machines for performing a set of services on the first and second sets of data message flows. The first set of forwarding rules specifies a first set of network addresses associated with the first set of edge machines and the second set of forwarding rules specifies a second set of network addresses associated with the second set of edge machines. The controller set monitors each edge machine in the first and second sets of edge machines to determine whether the edge machine is available to perform the set of services. After determining that each edge machine in the first set of edge machines is not available, the controller set reassigns the first set of network addresses from the first set of edge machines to the second set of edge machines such that the first MFE set forwards the first set of data message flows to the second set of edge machines based on the first set of forwarding rules.

In some embodiments, the edge cluster implements a gateway operating at a boundary between a logical network and an external network to forward data messages exchanged between the logical network and the external network. In such embodiments, the edge machines that implement the edge cluster operate to perform edge services (e.g., forwarding, middlebox services, etc.) on the flows exchanged between the logical and external networks.

The first and second MFE sets are configured in some embodiments with the first and second sets of forwarding rules to minimize forwarding data messages between the first and second datacenter location sets. Because a network administrator of the edge cluster is charged by the public cloud provider of the particular public cloud each time a data message is exchanged across datacenter location sets (e.g., when each datacenter location set is a different availability zone), the controller set minimizes such cross-location set traffic to minimize costs to the network administrator. The controller set in some embodiments allows cross-location set traffic when an entire set of edge machines in a particular datacenter location set fails, as with the first set of edge machines. In order to not drop flows received at the first MFE set, the controller set reassigns the first edge machine sets' network addresses to the second edge machine set, even though this means the flows will traverse multiple datacenter location sets.

In some embodiments, one or more edge machines of the edge cluster also perform one or more middlebox service operations on the data messages exchanged between the logical network and the external network in addition to forwarding the data messages. Examples of middlebox services an edge machine performs include firewall services, load balancing services, Network Address Translation (NAT) services, Intrusion Detection System (IDS) services, and Intrusion Prevention System (IPS) services. Any middlebox service can be performed by an edge machine of an edge cluster.

In some embodiments, set of controllers implements a local control plane (LCP) of the logical network. In such embodiments, the controller set is a first controller set, and a second set of one or more controllers implementing a central control plane (CCP) of the logical network directs the LCP to perform its operations. In some of these embodiments, the CCP is managed by a set of one or more management servers implementing a management plane (MP) of the logical network. In such embodiments, the MP interacts with the network administrator (e.g., through a user interface (UI), a graphical user interface (GUI), etc.) and directs the CCP to perform operations based on the MP's interactions with the network administrator.

Each edge machine is in some embodiments, one of a virtual machine (VM), a container, or a pod executing on a host computer. In such embodiments, the first set of edge machines executes on a first set of one or more host computers and the second set of edge machines executes on a second set of one or more host computers. In some embodiments, the first and second sets of host computers are mutually exclusive, meaning that no host computer executes both an edge machine in the first edge machine set and an edge machine in the second edge machine set. In other embodiments, at least a first edge machine in the first edge machine set and at least a second edge machine in the second edge machine set execute on a same host computer.

Examples of datacenter location sets include a set of different buildings in at one location or a set of different datacenters in different regions (e.g., neighborhoods, cities, states, countries, etc.). In several instances in the discussion below, "availability zone" or "AZ" is used to refer to a set of datacenter locations that are commonly situated, and the expression "different availability zones" is used to refer to different sets of datacenter locations of a public cloud provider. The use of these terms are not meant to refer to any one public cloud provider's infrastructure.

Several more detailed embodiments of the invention will now be described by reference to FIGS. 2 and 3. Before this description, FIG. 1 will be described in order to highlight a network administrator's view of a logical network versus an implementation of this logical network across multiple availability zones.

FIG. 1 illustrates an example logical edge gateway 100 of a network administrator's logical network 105 implemented as edge forwarding elements (FEs) 110-114 in a set of AZs 120-124. The logical edge gateway 100 can also be referred to as a logical edge router. Each AZ 120-124 includes a set of one or more edge FEs 110-114 for implementing the logical edge gateway 100. These edge FEs 110-114 are edge instances of an edge cluster implemented to represent the logical edge gateway 100. The network administrator views the implemented edge FEs 110-114 implemented in the different AZs 120-124 as the logical edge gateway 100 executing in the logical network 105. The logical network 105 also includes other network elements, such as logical routers 130, logical switches 132, logical middlebox elements 134, and machines 136.

The logical edge gateway 100 operates at the edge of the logical network 105 to provide edge services (e.g., forwarding) to data message flows entering and exiting the logical network (i.e., north-south traffic) and to data message flows exchanged within the logical network (i.e., east-west traffic). The logical edge gateway 100 is deployed in the AZs 120-124 as the cluster of edge FEs 110-114.

The logical network 105 and its components (i.e., the logical edge gateway 100, logical routers 130, logical switches 132, logical middlebox elements 134, and machines 136) are implemented using different physical components within these three AZs 120-124, (i.e., each component of the logical network 105 is mapped one or more components of the AZs 120-124).

A first AZ 120 implementing a first edge FE set 110 also includes a set of one or more managed routers 140, a set of one or more managed middlebox elements 142, one or more managed switches 144, and one or more machines 146. A second AZ 122 implementing a second edge FE set 112 also includes a set of one or more managed routers 150, a set of one or more managed middlebox elements 152, one or more managed switches 154, and one or more machines 156. A third AZ 124 implementing a third edge FE set 114 also includes a set of one or more managed routers 160, a set of one or more managed middlebox elements 162, one or more managed switches 164, and one or more machines 166.

The sets of managed routers 140, 150, and 160 are physical routers that implement the logical routers 130 of the logical network 105. The sets of managed middlebox elements 142, 152, and 162 are physical middlebox service machines that implement the logical middlebox elements 134 of the logical network 105. The sets of managed switches 144, 154, and 164 are physical switches that implement the logical switches 132 of the logical network 105. The sets of machines 146, 156, and 166 are physical machines implement the machines 136 (e.g., VMs, containers, pods) of the logical network 105. In some embodiments, one or more edge FEs of an edge FE set operating in an AZ performs the middlebox services for that AZ. For example, one or more edge FEs of the edge FE set 110 in some embodiments performs the middlebox services 142 for the AZ 120.

In some embodiments, each of the managed routers 140, 150, and 160 exchange flows with the edge FEs 110-114 using several tunnels connecting the managed routers to the edge FEs. In such embodiments, each managed router 140, 150, and 160 determines whether an edge FE is available for processing a received data message by performing bidirectional forwarding detection (BFD). For instance, managed routers 140 connect to each of the edge FEs 110-114 through a different tunnel. When one of the managed routers 140 receives an egress data message (i.e., a data message exiting the logical network 105), it determines which of the edge FEs 110 is available to process the egress data message. If the managed router 140 determines that a first edge FE of the set 110 is unavailable but a second edge FE of the set 110 is available, the managed router 140 encapsulates the egress data message with the correct tunnel header (e.g., specifying overlay information) and forwards the egress data message to the second edge FE of the set 110 through the associated tunnel. The overlay information includes in some embodiments L2 segment information and/or virtual extensible local area network (VXLAN) information.

If the managed router 140 determines that all of the edge FEs 110 are unavailable (e.g., by performing BFD), it identifies an available edge FE in one of the other edge FEs sets 112-114 to forward the egress data message. In such embodiments, the managed router 140 has an order of precedence of the edge FEs 110-114 for forwarding flows. When the managed router 140 redirects ("punts") the egress data message to another edge FE (in the same AZ 120 or in another AZ 122-124) after determining the first edge FE of the set 110 is unavailable, the managed router 140 in some embodiments updates the routing record for the flow of the egress data message to specify the other edge FE as the edge FE that is to process the flow.

In some embodiments, the AZs 120-124 are segregated networks of one cloud (e.g., of one public cloud, of one private cloud). In other embodiments, the AZs 120-124 are segregated networks of at least two clouds (e.g., of at least two public clouds, of at least two private clouds, of a combination of public and private clouds).

Each of the edge FEs 110-114 typically handles north-south traffic through its respective AZ, as the logical edge gateway 100 would handle north-south traffic between the network administrator's logical network 105 and one or more external networks. In addition, each AZ's edge FE set in some embodiments handles east-west traffic within its AZ. For example, when an AZ has multiple network segments (e.g., separate logical Layer 2 (L2) segments), the edge FE set of that AZ handles the east-west traffic between these network segments. This edge FE set can be used to send a data message from a first machine connected to a first L2 segment (e.g., a first logical switch) to a second machine connected to a second L2 segment (e.g., a second logical switch) by receiving the data message from the first machine and forwarding it to the second machine. In some embodiments, an edge FE in a particular AZ can send traffic to another edge FE in the same particular AZ to perform one or more services on the traffic and/or to forward the traffic on to one or more external networks.

A set of managers 170 implemented by one or more management servers manages the logical edge gateway 100. The manager set 170 interacts with the network administrator (e.g., through a UI, a GUI, etc. using Application Programming Interface (API) calls) to deploy the logical network 105 and its logical components in the AZs 120-124. A set of one or more controllers 180 configures and manages the edge cluster by direction of the manager set 170. The manager set 170 creates the user's view of the network (i.e., the logical network 105) and communicates with the controller set 180 to implement the user's view of the network and configure the edge FEs 110-114 and the AZs 120-124. The manager set 170 in some embodiments implements a management plane, and the controller set 180 in such embodiments implements a control plane.

Figure 2:
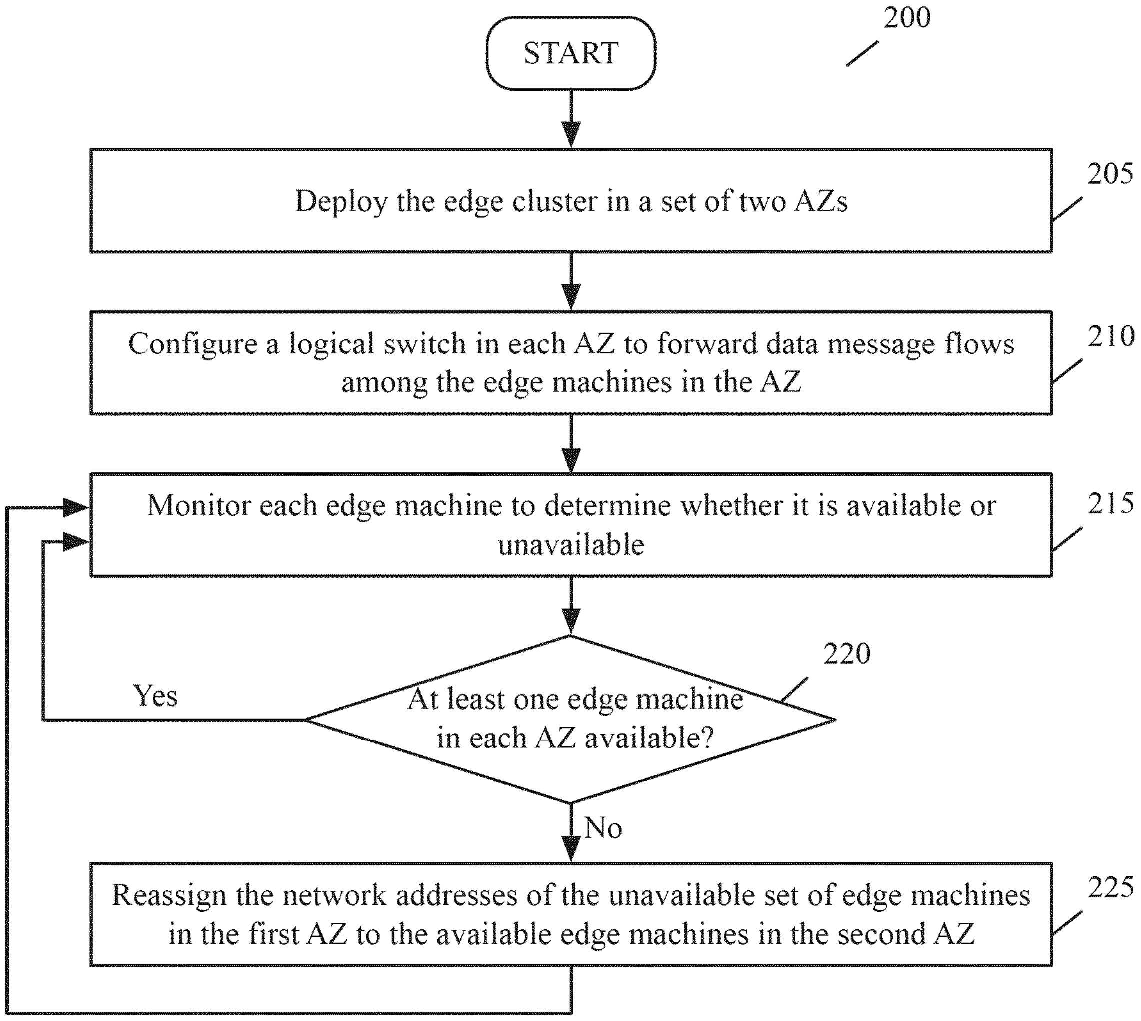
FIG. 2 conceptually illustrates a process of some embodiments for controlling data message flow processing by an edge cluster that spans multiple AZs.
Figure 3:
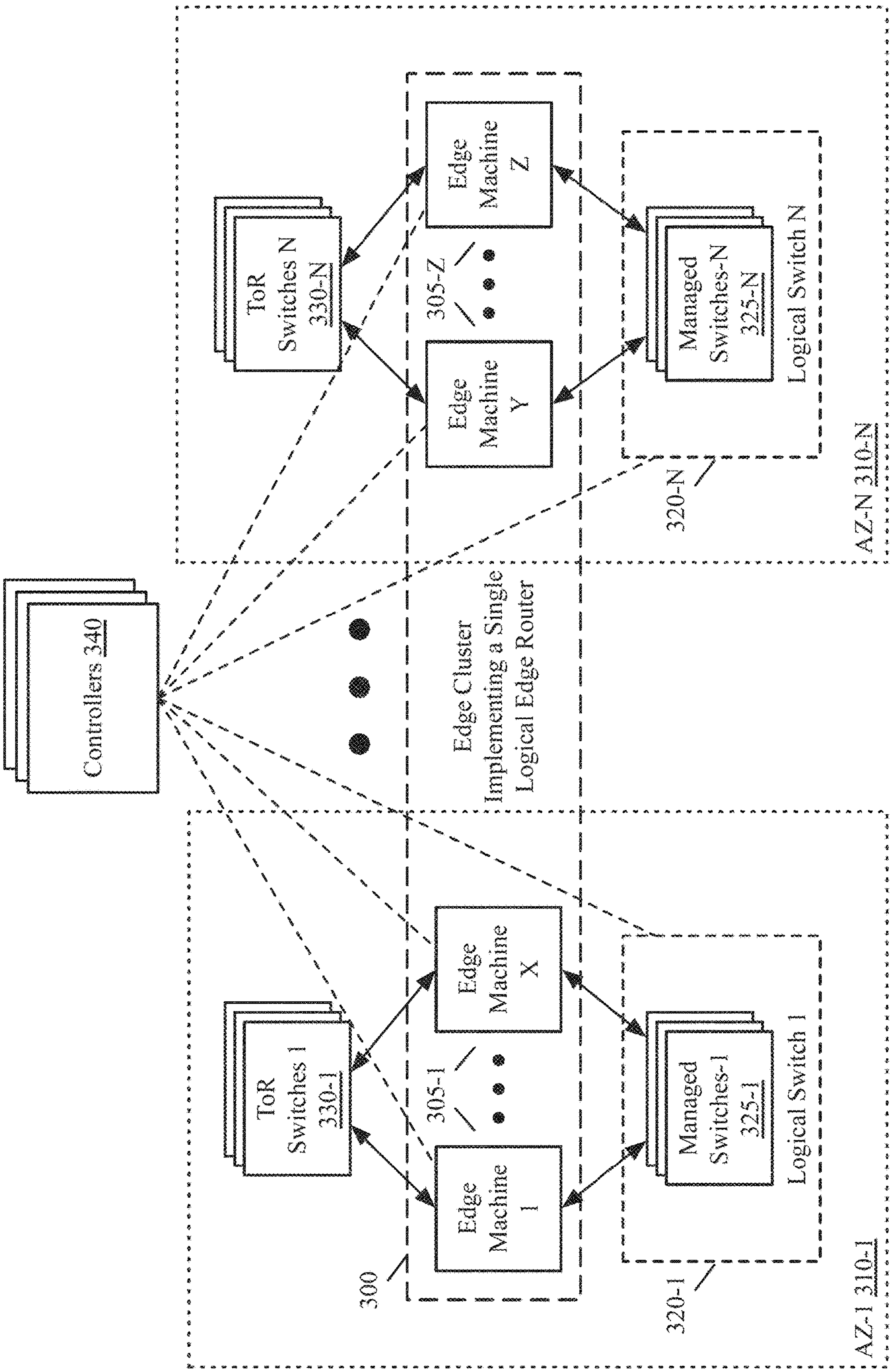
FIG. 3 illustrates an example edge cluster deployed as a set of edge machines in a set of AZs.

FIG. 2 conceptually illustrates a process 200 of some embodiments for controlling data message flow processing by an edge cluster that includes a first set of edge machines in a first AZ and a second set of edge machines in a second AZ. The process 200 is performed in some embodiments by a set of one or more controllers (e.g., implementing an LCP of the edge cluster). The set of controllers in some embodiments resides in one of the AZs spanned by the edge cluster (e.g., the first AZ or the second AZ). In other embodiments, at least one controller of the controller set resides in each AZ spanned by the edge cluster.

The process 200 of FIG. 2 will be described below by reference to FIG. 3, which illustrates a cluster of edge machines 300 (like the edge FEs 110-114 of FIG. 1) that implement a logical edge gateway (such as gateway 100 of FIG. 1). As shown, a controller set 340 (like controllers 180 of FIG. 1) configures the edge machines 305 to implement the edge cluster 300. The edge machines 305 are deployed as a single edge cluster 300 to implement one edge logical router from the network administrator's perspective.

The controller set 340 in some embodiments implements a control plane (e.g., an LCP) for the edge cluster 300. In some of these embodiments, the controller set 340 is directed to configure the edge cluster 300 by another controller set (e.g., a CCP), which is directed by a set of management servers (e.g., an MP). The controller set 340 also configures the managed switches 325 and middlebox elements (not shown) to implement the logical switches 320 and logical middlebox elements (not shown). The managed switches 325 are configured by the controller set 340 to act as the logical switches 320.

In some embodiments, the controller set 340 resides in a subset of one or more of the AZs 310. In other embodiments, each AZ 310 executes at least one controller of the controller set 340.

The process 200 begins by deploying (at 205) the edge cluster in a set of two AZs. The controller set 340 of some embodiments deploys the edge cluster 300 for a network administrator based on criteria received from the network administrator (e.g., in an API request). In some of these embodiments, the controller set 340 receives the criteria from one or more other controllers (not shown) implementing a CCP of the logical network (which received it from an MP (not shown)). In some embodiments, the controller set 340 directly deploys the edge cluster 300 in the two AZs 310. In other embodiments, the controller set 340 directs one or more deployment agents (not shown) operating in each AZ 310 to deploy the edge cluster 300.

The edge cluster 300 is deployed to include at least one edge machine 305 in each AZ 310 spanned by the edge cluster 300. Each edge machine 305 may be a VM, a container, or a pod executing on a host computer. In some embodiments, each AZ 310 includes at least one pair of edge machines 305. In such embodiments, the edge machines 305 are deployed in pairs and are not deployed individually.

The edge cluster 300 can be deployed in any number of AZs 310 and can include any number of edge machines 305 (e.g., VMs, containers, pods, etc.) per AZ 310. In some embodiments, each AZ 310 includes a same number of edge machines 305 for the edge cluster 300. In other embodiments, at least two AZs 310 include different numbers of edge machines 305 for the edge cluster 300. The edge cluster 300 implements a single edge logical router that operates at the boundary between a logical network and an external network to provide edge services (e.g., forwarding, middlebox services, etc.) to data messages exchanged between the logical and external networks.

In some embodiments, each edge machine 305 of the edge cluster 300 performs routing and forwarding on flows they receive. Conjunctively or alternatively, the edge machines 305 perform one or more middlebox services on the flows they receive, such as firewall services, load balancing services, NAT services, IDS/IPS services, etc. The edge cluster 300 operates to provide edge services at the boundary between a logical network and one or more external networks.

The set of AZs includes AZs of a particular public cloud managed by a particular public cloud provider (e.g., AWS, Azure, GCP, etc.). In other embodiments, the set of AZs includes AZs of two or more public clouds managed by at least one public cloud provider.

Next, the process 200 configures (at 210) a logical switch in each AZ to forward data message flows among the edge machines in the AZ. The controller set 340 configures, in each AZ 310 spanned by the edge cluster 300, a logical switch 320 to forward data message flows from sources in the AZ 310 (e.g., source machines (e.g., VMs, containers, pods, etc.) executing on source host computers) to the edge machines 305 executing in the AZ 310 so the edge machines 305 can perform routing and forwarding on the data message flows (and middlebox services, in some embodiments). Each logical switch 320 for each AZ 310 is implemented using a set of one or more managed switches 325 in that AZ. The managed switches 325 each handle traffic sent within its AZ 310 (i.e., east-west traffic) and traffic sent from its AZ 310 that is destined for destinations outside of the AZ 310 (i.e., south-to-north traffic).

The controller set 340 in some embodiments also configures different sets of Top-of-Rack (ToR) switches 330 in each AZ 310 to forward data message flows to the edge cluster 300. In such embodiments, the managed switches 325 forward data message flows from the logical network to the external network through the edge cluster 300, and the ToR switches 330 forward data message flows from the external network to the logical network through the edge cluster 300. Namely, the managed switches 325 handle egress traffic from the logical network and the TOR switches 330 handle ingress traffic from the external network. The ToR switches are in some embodiments third-party appliances. In other embodiments, the managed switches 325 handle traffic sent from outside its AZ 310 to destinations within its AZ 310 (i.e., north-to-south traffic).

In some embodiments, the managed switches 325 and ToR switches 330 handle different directions of the same set of bidirectional flows. In such embodiments, because the managed switches 325 and ToR switches 330 respectively handle egress and ingress flows, the managed switches 325 and ToR switches 330 handle different directions of the same flows. The ToR switches 330 forward data message flows to the edge machines 305 in some embodiments using equal-cost multi-path (ECMP) routing. In such embodiments, different data messages of a same flow may be forwarded to different edge machines 305 in one AZ 310, depending on which path a ToR switch 330 determines is the best path at that time.

The controller set 340 configures each logical switch 320 (i.e., each set of managed switches 325) with a set of forwarding rules that includes forwarding rules applicable to the edge machines 305 executing in the same AZ 310 as the logical switch 320. For example, the controller set 340 in some embodiments configures a first set of managed switches 320-1 in a first AZ 310-1 with a first set of forwarding rules that includes forwarding rules to forward flows to a first set of edge machines 305-1 executing in the first AZ 310-1.

Each forwarding rule specifies in some embodiments (1) a flow identifier (e.g., one or more of the five-tuple (i.e., source network address, destination network address, source port, destination port, protocol)) identifying a particular flow, and (2) a next hop (e.g., an output interface a network address such as an Internet Protocol (IP) address or Media Access Control (MAC) address) associated with the edge machine 305 that is to process that flow. Any suitable flow attribute or identifier (e.g., a Universally Unique Identifier (UUID) or Globally Unique Identifier (GUID)) may be included in a forwarding rule.

Each managed switch set 325 is configured with a set of forwarding rules specifying the edge machines 305 within its respective AZ 310 such that a managed switch 325 does not forward data message flows to an edge machine 305 executing in another AZ 310. Because the public cloud provider of the AZs 310 charges the network administrator for forwarding traffic between AZs 310, the controller set 340 minimizes these charges by configuring each managed switch set 325 to only forward traffic within its AZ 310.

Conjunctively or alternatively, each managed switch set 325 performs consistent hash calculations to forward flows to the edge machines 305 in its AZ 310. In such embodiments, each managed switch set 324 performs L2 switching that uses Layer 3 (L3) data message attributes to identify the owner of each data message it receives for switching. Namely, each managed switch set 325 determines which edge machine 305 to forward a data message based on the data message's L3 attributes.

When a data message is received at a particular port of a managed switch, the managed switch hashes the data message (e.g., hashes the data message's five-tuple). The managed switch uses the value generated from this hash as match criteria to identify its associated logical egress port of the logical switch the managed switch implements, and identifies an identifier of the assigned edge machine (e.g., an IP address of the edge machine, an interface of the edge machine, etc.) using the identified logical egress port. Then, the managed switch encapsulates the data message with header information relating to the identified edge machine (e.g., the identified IP address of the edge machine, the identified interface of the edge machine, etc.) and forwards the data message to that edge machine.

If the current edge machine is not the edge machine assigned for the data message's flow, the managed switch in some embodiments forwards the data message to a peer edge machine, where it hits a shadow port corresponding to the particular port of the managed switch. In some of these embodiments, the edge machines in a particular AZ are defined as a group of edge machines that defines the boundary for the logical forwarding element (LFE) implemented by the MFEs in the particular AZ, and is also defined internally for state synchronization. This is to optimize the cost of state synchronization.

For example, a logical router is implemented in some embodiments using a first set of four SR components in a first AZ and a second set of four SR components in a second AZ. As such, each AZ has two pairs of SR components. A pair of SR components or a pair of edge machines is referred to as a sub-cluster in some embodiments. The logical router will limit forwarding to be within each AZ, meaning that forwarding will not occur across AZ (except in scenarios when all SR components in a single AZ fail). State synchronization for the logical router in some embodiments is limited to each sub-cluster, meaning that only SR components that are pairs share state information with each other and not with other SR components in other SR component pairs. Methods and systems regarding logical switches, forwarding, and consistent hash are further described in U.S. Patent Publication 2023/0224240, which is incorporated by reference in this application.

In some embodiments, each logical switch 320 (i.e., each set of managed switches 325) is an instance of one distributed logical switch that spans the AZs 310. In such embodiments, while the instances implement one distributed logical switch, each instance receives a different set of forwarding rules relating to edge machines 305 in their respective AZ 310 to avoid cross-AZ traffic (i.e., no instance receives forwarding rules specifying edge machines 305 in other AZs 310, unless their AZ's edge machines are all unavailable). In some of these embodiments, each edge machine 305 includes a Tier-0 (T0) service router (SR) component and a Tier-1 (T1) SR component to implement a service router of the edge machine 305. In such embodiments, the T0 SR component receives flows from its associated managed switch set 325 and the T1 SR component receives flows from its associated ToR switch set 330.

At 215, the process 200 monitors each edge machine of the edge cluster to determine whether it is available or unavailable. The controller set 340 in some embodiments monitors each edge machine 305 in each AZ 310 to ensure that the managed switch set 325 within that AZ 310 is able to forward traffic to at least one edge machine 305 in the AZ 310. In some embodiments, the controller set 340 monitors each edge machine 305 by periodically sending heartbeat messages to each edge machine 305. For example, the controller set 340 in some embodiments forwards, to each edge machine 305 in each AZ 310, a first heartbeat data message. If the controller set 340 receives a reply second heartbeat data message back from the edge machine 305, the controller set 340 knows it is available (i.e., that it is operational). If the controller set 340 does not receive a reply second heartbeat data message back from the edge machine 305 within a particular period of time (e.g., defined by the network administrator), the controller set 340 determines that the edge machine 305 is unavailable (i.e., is not operational).

Conjunctively or alternatively, the controller set 340 monitors each edge machine 305 by collecting one or more metrics related to the edge machine 305 and/or the data message flows processed by the edge machine 305. In some of these embodiments, the controller set 340 collects metrics regarding the number of data messages processed by each edge machine 305. Using these metrics, the controller set 340 is able to determine whether each edge machine 340 is available by determining how many data messages the edge machine 305 has processed over a particular period of time. If the controller set 340 determines that an edge machine 305 has not processed any data messages for a period of time (e.g., for five minutes), the controller set 340 determines that the edge machine 305 is unavailable. Any suitable method for monitoring edge machines to determine whether they are available or not may be used.

Then, the process 200 determines (at 220) whether at least one edge machine in each AZ is available. The controller set 340 needs to determine whether at least one edge machine 305 in each AZ 310 is available such that the managed switch set 325 within that AZ 310 has at least one edge machine 305 to forward data message flows to for processing. If no edge machines 305 within an AZ 310 are available, the managed switch set 325 within that AZ 310 will not be able to use its configured set of forwarding rules to forward traffic, as the forwarding rules only specify edge machines 305 in the AZ 310.

If the process 200 determines that at least one edge machine in each AZ is available, the process 200 returns to step 215 to continue monitoring each edge machine of the edge cluster implementing the edge cluster. Because each managed switch set 325 has at least one available edge machine 305 to forward data message flows, the controller set 340 does not have to modify the forwarding rules or reconfigure the managed switches 325.

If the process 200 determines that at least one edge machine in each AZ is not available, the process 200 reassigns (at 225) the network addresses of the unavailable edge machines in a first AZ of the AZ set to the available edge machines in a second AZ of the AZ set. When the controller set 340 determines that no edge machines 305 in a particular AZ 310 are available, the controller set 340 reassigns the those edge machines' network addresses to one or more other AZ's edge machines. The one or more other AZ's edge machines continue to be assigned their originally assigned network addresses as well.

For example, if the controller set 340 determines that all edge machines 305-1 in the first AZ 310-1 are unavailable, the controller set 340 in some embodiments reassigns the network addresses originally assigned to the edge machines 305-1 to the edge machines 305-N in the Nth AZ 310-N. As such, the forwarding rules specifying the first AZ's edge machines' 305-1 network addresses will still specify these network addresses, but the first AZ's managed switch set 325-1 will be forwarding flows to the Nth AZ's edge machines 305-N.

By reassigning network addresses to available edge machines, the controller set 340 does not have to modify any of the forwarding rules or reconfigure the managed switch set 325 executing in the AZ 310 with no available edge machines 305. After reassigning the network addresses, the process 200 returns to step 215 to continue monitoring the edge machines. In some embodiments, the process 200 is performed indefinitely, as the controller set 340 continually monitors the edge machines 305 of the edge cluster 300. In other embodiments, the process 200 ends after a particular period of time (e.g., as specified by a network administrator). Still, in other embodiments, the process 200 ends after the controller set 340 is directed to end it by the network administrator.

By allowing cross-AZ traffic only in situations where all edge machines in an AZ are unavailable, the controller set 340 minimizes the cost incurred to the network administrator by the public cloud provider of the AZs 310.

In some embodiments, after the controller set 340 reassigns the network addresses of the unavailable set of edge machines in a first AZ to the available edge machines in one or more other AZs, the controller set 340 continues to monitor the first AZ's edge machines to determine when they become available again for processing flows. In such embodiments, when the controller set 340 determines that the first AZ's edge machines are available again, the controller set 340 reassigns the network addresses back to the first AZ's edge machines from the one or more other AZ's edge machines. After this, the managed switch set of the first AZ begins forwarding flows back to the first AZ's edge machines, avoiding cross-AZ forwarding again.

The controller set 340 in some embodiments determines that a first subset of edge machines in a particular AZ is not operational, and determines a second subset of one or more edge machines in the particular AZ is operational. Because only some of the edge machines in the particular AZ are not operational, rather than reassigning the network addresses of the non-operational first subset of edge machines to other edge machines in another AZ, the controller set 340 reassigns these network addresses to the second subset of edge machines. As such, the managed switch set of the particular AZ continues to forward flows to edge machines of the edge cluster 300 that are both operational and within the same AZ.

Figure 4A:
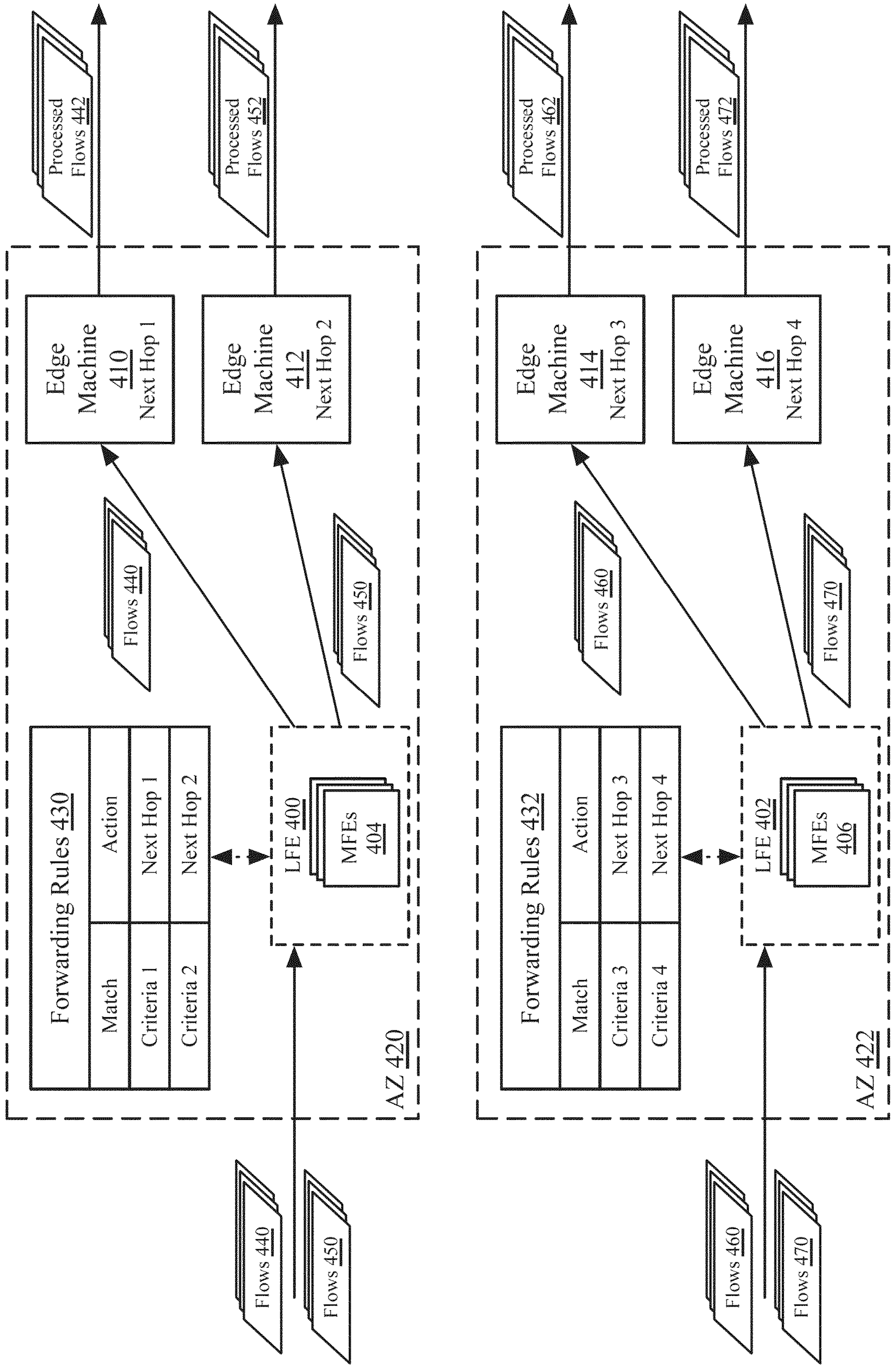
FIGS. 4A-B illustrate logical FEs implemented by MFEs operating in different AZs to forward flows to different edge machines of an edge cluster.
Figure 4B:
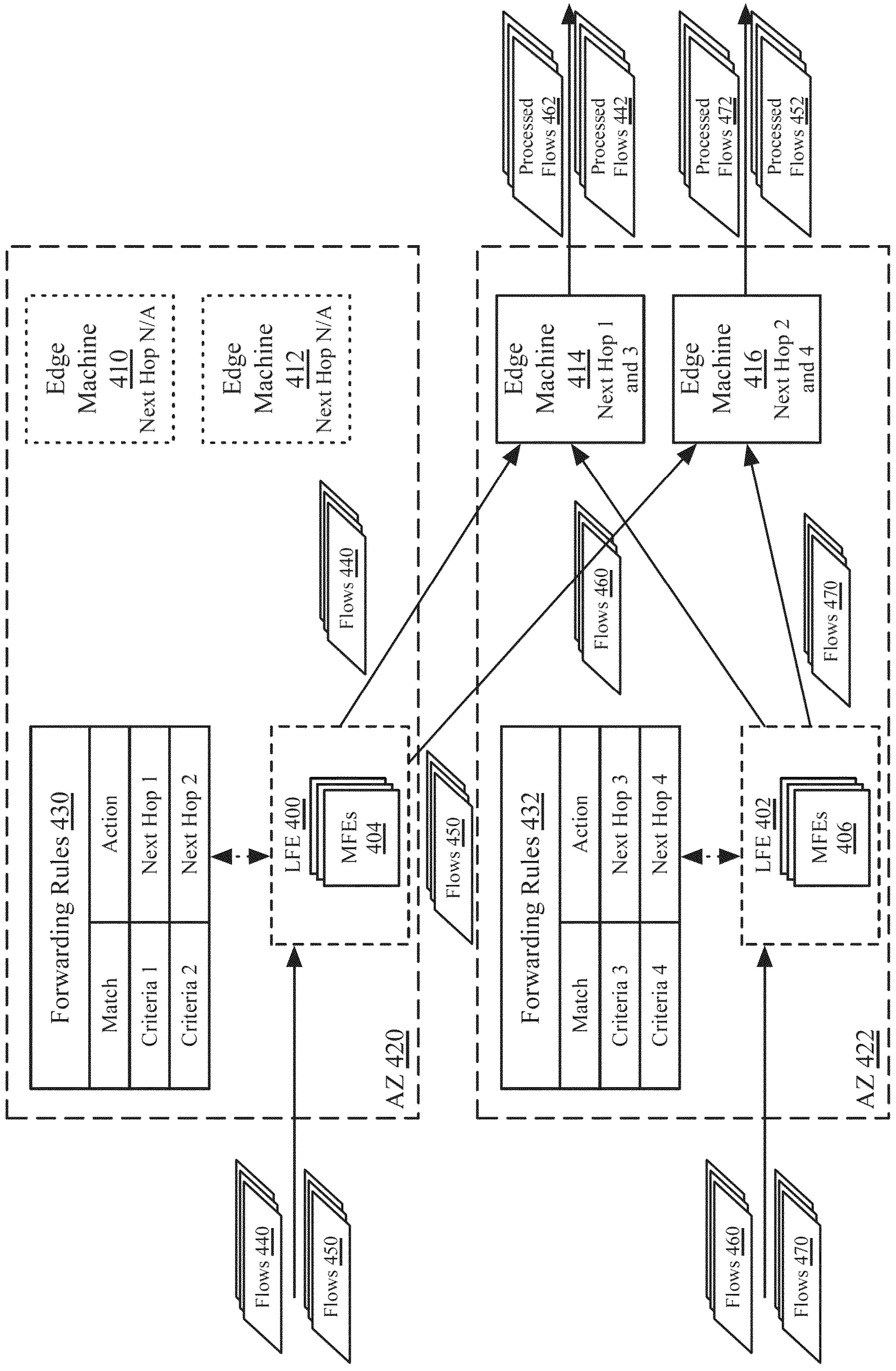

FIGS. 4A-B illustrate LFEs 400-402 each implemented by one or more MFEs 404-406 that forward flows to different edge machines 410-416 of an edge cluster. MFEs 404 implementing LFE 400 and edge machines 410-412 execute in a first AZ 420, and MFEs 404 implementing LFE 400 are configured with a first set of forwarding rules 430 for forwarding flows to the edge cluster. MFEs 406 implementing LFE 402 and edge machines 414-416 execute in a second AZ 422, and MFEs 406 implementing LFE 402 are configured with a second set of forwarding rules 432 for forwarding flows to the edge cluster. While only four edge machines 410-416 are illustrated in two AZs 420-422, one of ordinary skill would understand that any number of edge machines of an edge cluster can execute in any number of AZs.

The first set of forwarding rules 430 specifies, for use by the first set of MFEs 404, match criteria to match to received flows with next hops to forward the received flows to edge machines of the edge cluster. The second set of forwarding rules 432 specifies, for use by the second set of MFEs 406, match criteria to match to received flows with next hops to forward the received flows to edge machines of the edge cluster. When the MFEs 404 and 406 implement logical switches, the forwarding rule sets 430 and 432 specify match criteria (e.g., a destination MAC address, or a destination MAC address plus one or more other attributes, such as VLAN ID, or other five-tuple identifiers) and action criteria (e.g., an interface). When the FEs 404 and 406 implement logical routers, the forwarding rule sets 430 and 432 specify match criteria (e.g., a destination IP address, or a destination IP address plus one or more other attributes, such as other five-tuple values, as in the case of a policy-based routing (PBR) match criteria) and action criteria (e.g., an IP address or an output interface).

Any suitable match criteria can be used in a forwarding rule. The next hop of a forwarding rule in some embodiments specifies an interface of the MFEs 404-406 out of which to forward the corresponding flow. Conjunctively or alternatively, the next hop specifies a network address (e.g., MAC address, IP address). Any suitable next hop can be specified in a forwarding rule.

FIG. 4A illustrates the edge cluster when all edge machines 410-416 are available for processing flows. MFE set 404 receives a first set of flows 440, uses the forwarding rules 430 to match the flows 440 to Criteria 1 and to identify Next Hop 1, which is assigned to the first edge machine 410 of the edge cluster. After identifying the next hop, the MFE set 404 forwards the first set of flows 440 to the first edge machine 410 for processing, and the first edge machine 410 forwards the processed flows 442 to their destinations. MFE set 404 also receives a second set of flows 450, uses the forwarding rules 430 to match the flows 450 to Criteria 2 and to identify Next Hop 2, which is assigned to the second edge machine 412 of the edge cluster. After identifying the next hop, the MFE set 404 forwards the second set of flows 450 to the second edge machine 412 for processing, and the second edge machine 412 forwards the processed flows 452 to their destinations.

MFE set 406 receives a third set of flows 460, uses the forwarding rules 432 to match the flows 460 to Criteria 3 and to identify Next Hop 3, which is assigned to the third edge machine 414 of the edge cluster. After identifying the next hop, the MFE set 406 forwards the third set of flows 460 to the third edge machine 414 for processing, and the third edge machine 414 forwards the processed flows 462 to their destinations. MFE set 406 also receives a fourth set of flows 470, uses the forwarding rules 432 to match the flows 470 to Criteria 4 and to identify Next Hop 4, which is assigned to the fourth edge machine 416 of the edge cluster. After identifying the next hop, the MFE set 406 forwards the fourth set of flows 470 to the fourth edge machine 416 for processing, and the fourth edge machine 416 forwards the processed flows 472 to their destinations.

Each edge machine 410-416 performs forwarding and/or service operations to process the flows it receives. In some embodiments, edge machines perform middlebox services on flows they process, such as firewall services, load balancing services, NAT services, IDS,IPS services, etc., before forwarding the processed flows.

Because each MFE set 404-406 implementing the LFEs 400-402 forwards flows to edge machines within their AZs 420-422, the network administrator of the edge cluster is not charged for cross-AZ forwarding, as no such forwarding of flows occurs.

FIG. 4B illustrates the edge cluster when the first and second edge machines 410-412 are unavailable for processing flows (as denoted by short-dashed lines). After a controller set (not shown) implementing an LCP determines that no edge machines of the edge cluster executing in the first AZ 420 are available, the controller set reassigns their next hops (i.e., Next Hop 1 and Next Hop 2) to the edge machines 414-416. As such, the third edge machine 414 is assigned its originally assigned Next Hop 3 and the first edge machine's Next Hop 1. The fourth edge machine 416 is assigned its originally assigned Next Hop 4 and the second edge machine's Next Hop 2.

After this reassignment of next hops, the MFE set 404 of the first AZ 420 receives the first set of flows 440, uses the first set of forwarding rules 430 to match the flows 440 to Criteria 1 and to identify Next Hop 1, and forwards the flows 440 to the third edge machine 414 of the second AZ 422, as this edge machine 414 is now assigned that next hop. The MFE set 404 of the first AZ 420 receives the second set of flows 450, uses the first set of forwarding rules 430 to match the flows 440 to Criteria 2 and to identify Next Hop 2, and forwards the flows 450 to the fourth edge machine 416 in the second AZ 422, as this edge machine 416 is now assigned that next hop. The MFE set 406 of the second AZ 422 continues to forward the flows 460 and 470 respectively to the third and fourth edge machines 414-416, as they are still operational.

The MFE set 404 implementing the LFE 400 only forwards the flows 440 and 450 across AZs 420-422 because the edge machines 410-412 are unavailable. As such, cross-AZ forwarding only occurs when it is necessary.

Figure 5:
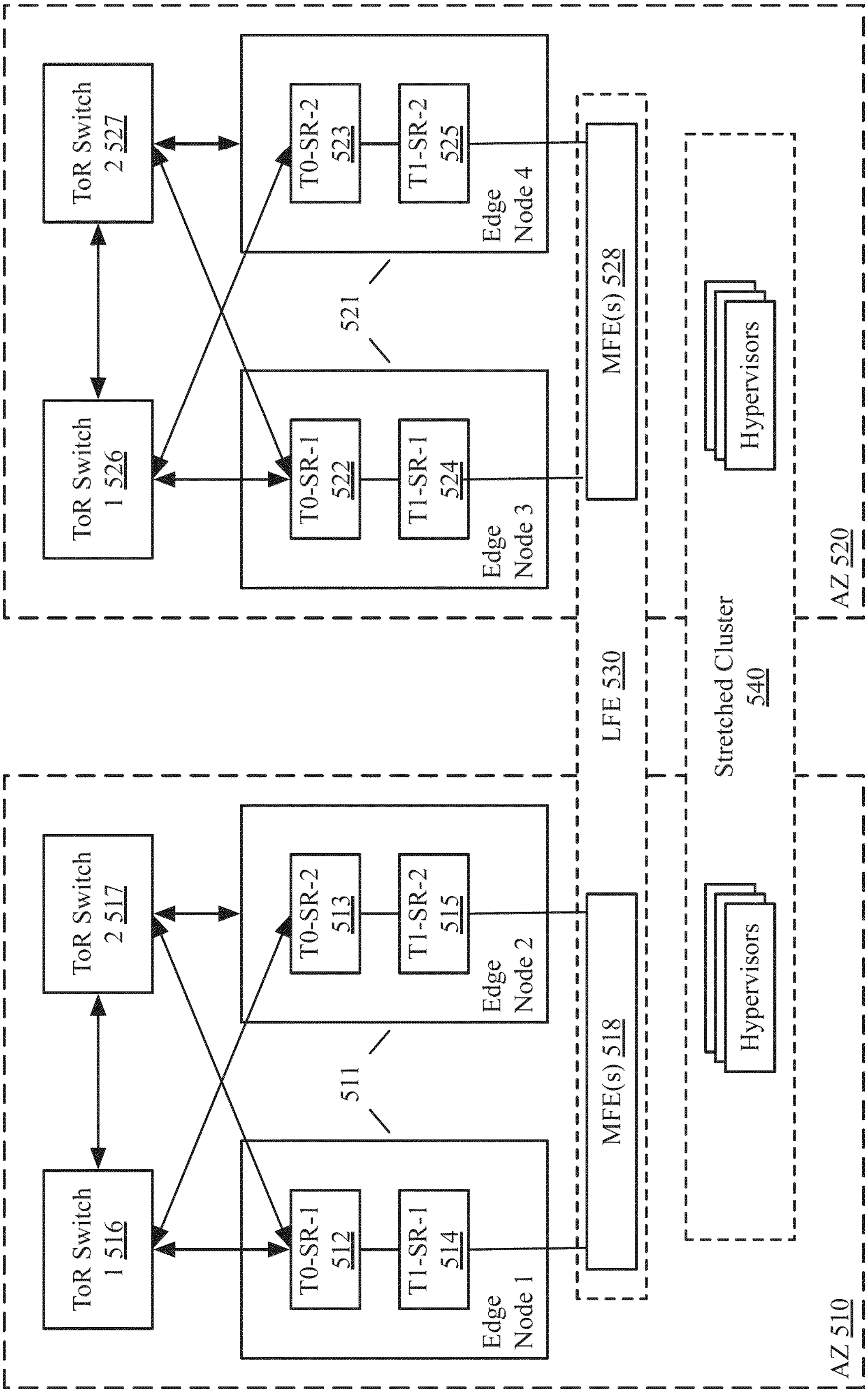
FIG. 5 illustrates another example edge cluster implemented in a set of two AZs of a particular public cloud.

FIG. 5 illustrates an example edge cluster deployed in a set of two AZs 510 and 520 of a particular public cloud. These AZs 510 and 520 may be zones of any public cloud provider, such as AWS, Azure, GCP, etc. Each AZ 510 and 520 respectively includes a pair of edge nodes 511 and 521 (also referred to as a sub-cluster). Edge nodes are edge forwarding elements in some embodiments, implemented as machines (e.g., VMs, containers, pods, etc.). Multiple edge nodes of one edge cluster collectively implement an edge forwarding element (e.g., a gateway) to provide edge services at the boundary of a logical network.

In some embodiments, when the edge cluster is first deployed, one edge node pair is deployed in each AZ 510 and 520 (as shown), and the edge cluster can be scaled out to include more edge node pairs in each AZ 510 and 520. In other embodiments, two or more edge node pairs deployed in a single AZ when the edge cluster is first deployed. In some embodiments, each AZ 510 and 520 in which the edge cluster is deployed includes the same number of edge node pairs. In other embodiments, different AZs include different numbers of edge node pairs, which may be based on the available capacity of the AZ.

For example, a set of controllers (not shown) deploying the edge cluster determines the available capacity of each AZ 510 and 520 before deploying the edge cluster. Based on this information, the controller set determines how many sub-clusters to deploy in each AZ 510 and 520, and then deploys the edge cluster.

In AZ 510, edge nodes of the pair 511 each respectively include a T0 SR 512 and 513 and aT1 SR 514 and 515 to implement an SR for the edge node. The T0 SRs 512 and 513 communicate with two ToR switches 516 and 517 of the AZ 510 that perform ECMP routing to forward flows to the edge nodes 511. In AZ 520, edge nodes of the pair 521 each include a T0 SR 522 and 523 and a T1 SR 524 and 525 to implement an SR for the edge node. The T0 SRs 522 and 523 communicate with ToR switches 526 and 527 of the AZ 520 that perform ECMP routing to forward flows to the edge nodes 521. These ToR switches 516, 517, 526, and 527 communicate with the SR components of the edge cluster for exchanging ingress and egress traffic between the edge cluster operating at the boundary of a logical network and one or more external networks. In other embodiments, at least one of the AZs 510 and 520 includes only one ToR switch.

An LFE is implemented by a set of one or more MFEs. An LFE spanning multiple AZs is implemented by multiple MFEs operating at the multiple AZs. An LFE in one AZ is implemented by a set of one or more MFEs in that one AZ.

In some embodiments the MFEs 518 and 528 are configured to define one or more LFEs, such as the LFE 530, in the AZs 510 and 520. In some of these embodiments, the MFEs 518 and 528 are configured to implement logical switches and/or logical routers in each AZ 510 and 520. In other embodiments, the MFEs 518 and 528 are configured to implement other LFEs that are separate from the logical switches and/or logical routers spanning each AZ 510 and 520 (such as the LFE 530). Still, in other embodiments, the MFEs 518 and 528 are not configured to define LFEs in the AZs 510 and 520.

The LFE 530 is in some embodiments a logical router. In such embodiments, the logical router uses flow rules specifying match criteria (e.g., a destination IP address, or a destination IP address plus one or more other attributes, such as other five-tuple values, as in the case of a PBR match criteria) and action criteria (e.g., the next hop, which may be an IP address or an interface). In some of these embodiments, the MFEs 518 forward flows to the edge nodes 511 and 521 using PBR rules. In such embodiments, the PBR rules are determined (e.g., by the controller set deploying the edge nodes 511 and 521) based on one or more policies defined by the network administrator of the edge nodes 511 and 521 and are provided to the logical router.

In other embodiments the LFE 530 is a logical switch. In such embodiments, the logical switch forwards flows to the edge nodes 511 and 521 using forwarding rules that specify match criteria (e.g., destination MAC address, or a destination MAC address plus one or more other attributes, such as a VLAN ID, or other five-tuple identifiers) and action criteria (e.g., the next hop, which may be an IP address or an interface).

When the LFE 530 is a logical switch, the LFE 530 is in some embodiments a transit logical switch executing between T1 distributed routers and a T1 service router (not shown). This transit logical switch performs one or more of local forwarding and redirecting ("punting") within its AZ and punting across AZs. In some embodiments, the LFE 530 is implemented as two transit logical switches, with one transit logical switch for local punting and another transit logical switch for cross-AZ punting. Alternatively to being a transit logical switch, the LFE 530 is in other embodiments a logical switch that is not a transit logical switch between distributed and service routers. For example, the logical switch in such embodiments is a backplane logical switch.

The AZs 510 and 520 in some embodiments also include a physical router (not shown) implementing an intervening fabric. In such embodiments, the managed switches 518 and 518 implementing the LFE 530 perform L3 encapsulation on flows to navigate through the intervening routing fabric underlay. This L3 encapsulation includes logical L2 overlay information in some embodiments. In such embodiments, the L3 headers including the L2 information are used to forward data messages from one switch to another. Conjunctively or alternatively, the managed switches 518 and 528 encapsulate flows with another encapsulation header that includes the logical L2 overlay information.

The MFEs 518 and 528 handle the data message flows between components in the logical network and the edge cluster. For example, each MFE 518 in AZ 510 in some embodiments uses forwarding rules to forward egress data messages from sources within the logical network to the edge nodes 511, and each MFE 528 in AZ 520 uses a second set of forwarding rules to forward egress data messages from sources within the logical network to the edge nodes 521. In such embodiments, each of the MFEs 518 and 518 does not forward flows to edge nodes in other AZs, unless each edge node within their AZ has failed (i.e., is not operational or available). In some of these embodiments, each of the MFEs 518 and 528 implementing the LFE 530 receives (e.g., from a controller set (not shown)) a different routing table that is used to forward data messages among their associated edge machines 511 or 521.

In some embodiments, the MFEs 518 and 528 are configured (e.g., by a set of one or more controllers) with forwarding rules that allow the MFEs to correctly forward each egress flow to the correct edge node 511 or 521 to perform one or more services on the flows before supplying the flows to one or more external networks. These rules in some embodiments configure several MFEs 518 and/or 528 to implement one LFE 530 that serves as the logical data plane for forwarding each egress flow to the correct edge node 511 or 521. In other embodiments, these rules configure several MFEs 518 and/or 528 to implement several LFEs that collectively serve as the logical data plane for forwarding each egress flow to the correct edge node 511 or 521.

Each forwarding rule in some embodiments has match attributes and action attributes. In such embodiments, match attributes of the forwarding rules are compared to the attributes of a flow to identify an action to perform on the flow. The action specifies a sequence of edge nodes (e.g., a hierarchical list of interfaces of the MFEs 518 and 528 associated with the edge nodes, a hierarchical list of identifiers (e.g., UUIDs, GUIs, network addresses, etc.) for each edge node) for processing the flow. This sequence of edge nodes allows the MFEs 518 and 528 to forward flows to different edge nodes in a priority order.

For example, MFE 518 in some embodiments stores a forwarding rule that has a priority action list specifying (1) a first interface corresponding to edge node 1, (2) a second interface corresponding to edge node 2, (3) a third interface corresponding to edge node 3, and (4) a fourth interface corresponding to edge node 4. If edge node 1 is unavailable, MFE 518 forwards flows to edge node 2. If edge node 2 is also unavailable, MFE 518 forwards flows to edge node 3. If edge node 3 is also unavailable, MFE 518 forwards flows to edge node 4.

In other embodiments, several forwarding rules each specify a different edge node in relation to the action criteria. In some of these embodiments, an agent operating in each AZ 510 and 520 (not shown) or a set of controllers (not shown) operating in each AZ 510 and 520 monitors the status of each of the edge nodes 511 and 521 and provides status updates for storing in the MFEs' forwarding rules. For example, in these embodiments, MFE 518 stores four separate forwarding rules for the four edge nodes 511 and 521. The agent or set of controllers monitoring the edge nodes 511 and 521 updates the status of each edge node in these forwarding rules.

When edge node 1's forwarding rule specifies that the edge node is available, MFE 518 forwards flows to edge node 1. When edge node 1's forwarding rule specifies that the edge node is unavailable, MFE 518 forwards flows to edge node 2. When edge node 2's forwarding rule specifies that the edge node is unavailable, MFE 518 forwards flows to edge node 3. When edge node 3's forwarding rule specifies that the edge node is unavailable, MFE 518 forwards flows to edge node 4.

Still, in other embodiments, each MFE 518 and 528 stores one forwarding rule that specifies one edge node for forwarding flows. In such embodiments, an agent (not shown) or a set of controllers (not shown) operating in each AZ 510 and 520 monitors the status of each edge node 511 and 521, and, when an edge node becomes unavailable, the agent or controller set updates the forwarding rule or rules that specify this edge node to instead specify another edge node that is available.

For example, MFE 518 in some embodiments stores one forwarding rule that specifies it is to forward flows to edge node 1. If the agent or controller set determines that edge node 1 is unavailable, the agent or controller set updates the forwarding rule stored by MFE 518 to specify edge node 2 instead so MFE 518 forwards subsequent flows to edge node 2. If the agent or controller set determines that edge node 2 is also unavailable, the agent or controller set updates the forwarding rule stored by MFE 518 to specify edge node 3 instead so MFE 518 forwards subsequent flows to edge node 3. If the agent or controller set determines that edge node 3 is also unavailable, the agent or controller set updates the forwarding rule stored by MFE 518 to specify edge node 4 instead so MFE 518 forwards subsequent flows to edge node 4.

An MFE 518 or 528 forwards a data message to an edge node 511 or 521 for forwarding outside of the logical network. In some embodiments, the edge node additionally performs one or more stateful services on the data message before forwarding it. In such embodiments, the data message has to be processed by a same edge node because the edge node stores necessary state information needed for processing the data message. In some of these embodiments, each sub-cluster 511 and 521 shares state information within the sub-cluster such that each edge node in each sub cluster can perform the same stateful services. In other embodiments, state information is not shared.

Conjunctively or alternatively to punting flows that have stateful services performed on them, one of the MFEs 518 or 528 in some embodiments punts a data message because the edge node assigned to that data message's flow is unavailable to process it. As such, the MFE punts the data message to another edge node in the same AZ (when at least one other edge node in the same AZ is available) or to another edge node in another AZ (when all edge nodes within the AZ are unavailable).

An edge node in some embodiments uses one or more middlebox elements (e.g., service machines, service VMs (SVMs), service nodes, etc.) to perform one or more middlebox services on data message flows. In some of these embodiments, the edge node provides data messages (e.g., through a tunnel, using a bump-in-the-wire connection, etc.) to these middlebox elements for them to perform the required services. The edge node is considered unavailable when a particular middlebox element the edge node uses to perform a particular set of one or more services is unavailable (e.g., when it goes offline, when it stops being responsive, etc.).

When this occurs, even though the edge node itself is operational, the edge node is considered to be unavailable because it cannot perform the particular set of services that it performs using the unavailable particular middlebox element. In such embodiments, an MFE associated with that edge node punts data messages that need that one or more of the particular set of services to one or more other MFEs in the same AZ and/or in other AZs. For example, edge nodes 511 use a particular SVM (now shown) in AZ 510 to perform a particular service. If the particular SVM is unavailable, the MFEs 518 forward flows requiring the particular service instead to one of the edge nodes 521 that can perform the particular service.

In some embodiments, a stretched cluster of hypervisors 540 spans the AZs 510 and 520. The controller set configuring the edge nodes 511 and 521 knows which host of these hypervisors 540 resides in which AZ 510 or 520. The controller set distributes the correct routing table to each host of the hypervisors 540 based on its placement in the AZs 510 and 520. Each host of the hypervisors 540 is programmed to route data message flows to the edge nodes 511 or 521 residing in their same AZ 510 or 520. In some embodiments, the default route specified in each routing table points to local edge nodes.

When an LFE is local to an AZ (i.e., when an LFE is not implemented in a distributed configuration across multiple AZs), each edge machine advertises a different classless inter-domain routing (CIDR) to upstream (i.e., to its associated ToR switches in the AZ). Because of this, north-to-south traffic from the ToR switches will reach the correct edge machine. However, when an LFE is distributed across multiple AZs, some embodiments automatically configure an N:1 source network address translation (SNAT) rule (e.g., as per choice by a network administrator) on each AZ spanned by the LFE. This ensures that ingress traffic from the ToR switches to the edge cluster reach the same edge machines as the corresponding egress traffic from the LFE (i.e., that each bidirectional flow is processed by a same edge machine). In such embodiments, the edge machines advertise their NAT IP address (which is exclusive to location) to the ToR switches.

In some embodiments, edge nodes within a single AZ synchronize state information with each other (also referred to as sharing state information). In some of these embodiments, edge nodes in different AZs do not share state information with each other. There are two types of state information synchronization. The first type is a flow synchronization and connection table synchronization, which is synchronized within each edge machine set of each AZ. This implies that a connection will not be dropped if an edge machine fails. However, if all edge machines in an AZ fail, then the existing flow and connection state will be lost.

The second type is high availability (HA) state management. A controller set that configures an edge cluster (i.e., the LCP of the edge cluster) in some embodiments executes an HA state machine that maintains the state for all edge machines in the edge cluster. The HA state machine synchronizes the health of each edge machine to all other edge machines in the same AZ (which is referred to as a full mesh synchronization, in some embodiments). The health of each node in some embodiments includes information related to physical connectivity managed by BFD, internal process health, and/or routing health (e.g., border gateway protocol (BGP), open shortest path first (OSPF)).

Based on this health information, the controller set is able to determine whether it needs to perform failover actions or not (e.g., if it needs to reassign network addresses from unavailable edge machines to available edge machines). If an edge machine fails, the controller set in some embodiments reassigns its network address to another edge machine in the same AZ. If a first subset of one or more edge machines in one AZ fails, the controller set reassigns its network addresses to a second subset of one or more edge machines in the AZ. If all edge machines in an AZ fail, the controller set reassigns their network addresses to other edge machines in one or more other AZs.

While the above described embodiments have been described for an edge cluster implemented across multiple AZs of one public cloud, the embodiments described are also applicable to an edge cluster implemented across multiple AZs of two or more public clouds. In such embodiments, the two or more public clouds may be managed by two or more public cloud providers. The above described embodiments are also applicable to an edge cluster implemented in two or more virtual private clouds (VPCs) of a public cloud.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
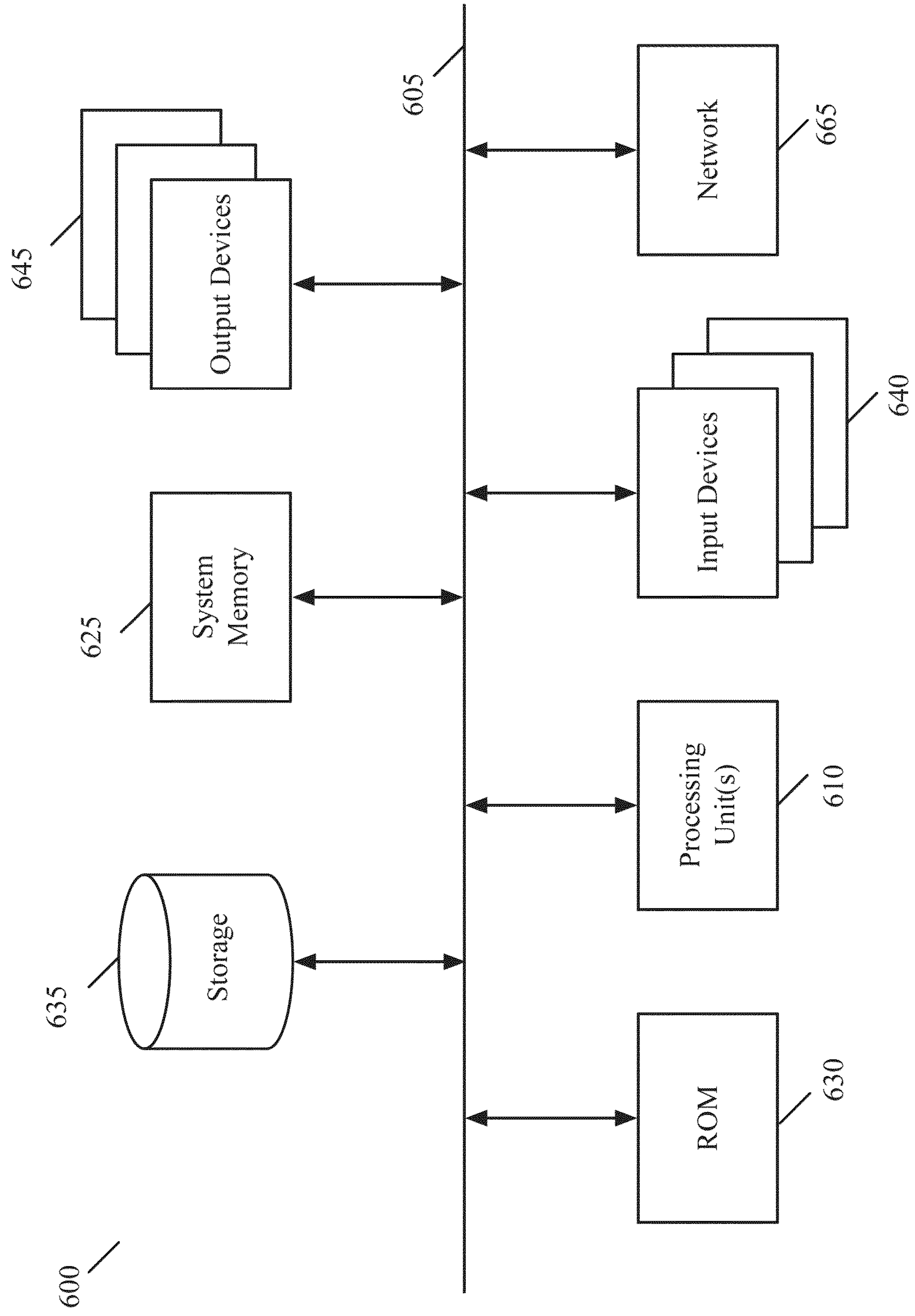
FIG. 6 conceptually illustrates an electronic system with which some embodiments of the invention are implemented.

FIG. 6 conceptually illustrates a computer system 600 with which some embodiments of the invention are implemented. The computer system 600 can be used to implement any of the above-described computers and servers. As such, it can be used to execute any of the above described processes. This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIG. 2) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for controlling data message flow processing by an edge cluster that comprises (i) a first set of edge machines operating in a first set of locations of a particular public cloud and (ii) a second set of edge machines operating in a second set of locations of the particular public cloud, the method comprising:

at a set of one or more controllers that controls the edge cluster:

configuring first and second sets of managed forwarding elements (MFEs) operating in the first and second location sets respectively with first and second sets of forwarding rules to respectively forward first and second sets of data message flows to the first and second sets of edge machines for performing a set of services on the first and second sets of data message flows, the first set of forwarding rules specifying a first set of network addresses associated with the first set of edge machines and the second set of forwarding rules specifying a second set of network addresses associated with the second set of edge machines;

configuring a first set of Top-of-Rack (ToR) switches operating in the first location set to forward a third set of data message flows to the first set of edge machines to perform the set of services on the third set data message flows;

configuring a second set of ToR switches operating in the second location set to forward a fourth set of data message flows to the second set of edge machines to perform the set of services on the fourth set data message flows;

monitoring each edge machine in the first and second sets of edge machines to determine whether the edge machine is available to perform the set of services; and after determining that each edge machine in the first set of edge machines is not available, reassigning the first set of network addresses from the first set of edge machines to the second set of edge machines such that the first MFE set forwards the first set of data message flows to the second set of edge machines based on the first set of forwarding rules.

2. The method of claim 1, wherein the edge cluster implements a gateway operating at a boundary between a logical network and an external network to forward data messages exchanged between the logical network and the external network.

3. The method of claim 2, wherein the set of controllers implements a local control plane (LCP) of the logical network.

4. The method of claim 1, wherein the first and second MFE sets are configured with the first and second sets of forwarding rules to minimize forwarding data messages between the first and second sets of locations.

5. The method of claim 1, wherein monitoring each edge machine comprises periodically sending heartbeat data messages to the edge machine to determine whether it is available to perform the set of services.

6. The method of claim 5 further comprising determining that at least one edge machine in the second set of edge machines is available to perform the set of services.

7. The method of claim 6, wherein:

determining that the at least one edge machine in the second set of edge machines is available to perform the set of services comprises receiving, from the at least one edge machine, one or more reply heartbeat data messages indicating that the at least one edge machine is available to perform the set of services, and determining that each edge machine in the first set of edge machines is not available comprises not receiving, from each edge machine in the first set of edge machines, a reply heartbeat data message indicating that each edge machine in the first set of edge machines is unavailable to perform the set of services.

8. The method of claim 5, wherein one or more edge machines of the edge cluster also perform one or more middlebox service operations on the data messages exchanged between a logical network and an external network.

9. The method of claim 8, wherein the one or more middlebox service operations comprise one or more of firewall services, load balancing services, Network Address Translation (NAT) services, Intrusion Detection System (IDS) services, and Intrusion Prevention System (IPS) services.

10. The method of claim 1, wherein:

the first and second MFE sets forward the first and second sets of data message flows from a logical network to an external network through the edge cluster, and the first and second sets of ToR switches forward the third and fourth sets of data message flows from the external network to the logical network through the edge cluster.

11. The method of claim 10, wherein the first and third sets of data message flows are different directions of a first same set of bidirectional flows, and the second and fourth sets of data message flows are different directions of a second same set of bidirectional flows.

12. The method of claim 1, wherein the first and second sets of TOR switches forward the third and fourth data message flows to the first and second sets of edge machines using equal-cost multi-path (ECMP) routing.

13. The method of claim 1 further comprising:

after a particular period of time, determining that the first set of edge machines is available to perform the set of services; and reassigning the first set of network addresses back to the first set of edge machines such that the first MFE set forwards subsequent data messages of the first set of data message flows to the first set of edge machines.

14. The method of claim 1, wherein the first and second locations sets are first and second availability zones of the particular public cloud.

15. The method of claim 1, wherein each edge machine is one of a virtual machine (VM), a container, or a pod executing on a host computer.

16. The method of claim 15, wherein each MFE is one of a managed switch or a managed router.

17. The method of claim 16, wherein each MFE set implements one or more instances of one distributed logical forwarding element that spans the first and second location sets.

18. The method of claim 16, wherein each MFE is a managed router, and the first and second sets of forwarding rules are first and second sets of policy-based routing (PBR) rules.

19. A non-transitory machine readable medium storing a program for execution by at least one processing unit for controlling data message flow processing by an edge cluster that comprises (i) a first set of edge machines operating in a first set of locations of a particular public cloud and (ii) a second set of edge machines operating in a second set of locations of the particular public cloud, the program comprising sets of instructions for:

at a set of one or more controllers that controls the edge cluster:

configuring first and second sets of managed forwarding elements (MFEs) operating in the first and second location sets respectively with first and second sets of forwarding rules to respectively forward first and second sets of data message flows to the first and second sets of edge machines for performing a set of services on the first and second sets of data message flows, the first set of forwarding rules specifying a first set of network addresses associated with the first set of edge machines and the second set of forwarding rules specifying a second set of network addresses associated with the second set of edge machines;

configuring a first set of Top-of-Rack (ToR) switches operating in the first location set to forward a third set of data message flows to the first set of edge machines to perform the set of services on the third set data message flows;

configuring a second set of ToR switches operating in the second location set to forward a fourth set of data message flows to the second set of edge machines to perform the set of services on the fourth set data message flows;

monitoring each edge machine in the first and second sets of edge machines to determine whether the edge machine is available to perform the set of services by periodically sending heartbeat data messages to the edge machine; and after determining that each edge machine in the first set of edge machines is not available, reassigning the first set of network addresses from the first set of edge machines to the second set of edge machines such that the first MFE set forwards the first set of data message flows to the second set of edge machines based on the first set of forwarding rules.

* * * * *